(12) United States Patent  
Reichert et al.

(10) Patent No.: US 9,616,383 B2  
(45) Date of Patent: Apr. 11, 2017

(54) COMPACT SELECTIVE CATALYTIC REDUCTION SYSTEM FOR NITROGEN OXIDE REDUCTION IN THE OXYGEN-RICH EXHAUST OF 500 TO 4500 KW INTERNAL COMBUSTION ENGINES

(71) Applicant: JOHNSON MATTHEY CATALYSTS (GERMANY) GMBH, Redwitz (DE)

(72) Inventors: Dirk Reichert, Karlsruhe (DE); Daniel Kuegel, Burgkunstadt (DE); Ilir Piluri, Munich (DE)

(73) Assignee: Johnson Matthey Catalysts (Germany) GMBH, Redwitz (DE)

( * ) Notice: Subject to any disclaimer, the term of this patent is extended or adjusted under 35 U.S.C. 154(b) by 0 days.

(21) Appl. No.: 14/613,749

(22) Filed: Feb. 4, 2015

(65) Prior Publication Data

US 2015/0217230 A1     Aug. 6, 2015

Related U.S. Application Data

(60) Provisional application No. 61/936,611, filed on Feb. 6, 2014.

(51) Int. Cl.
*B01D 53/94* (2006.01)
*F01N 3/18* (2006.01)
(Continued)

(52) U.S. Cl.
CPC ....... *B01D 53/9431* (2013.01); *F01N 3/2066* (2013.01); *F01N 3/2892* (2013.01); *B01D 2251/2062* (2013.01); *F01N 2240/20* (2013.01); *F01N 2260/08* (2013.01); *F01N 2340/00* (2013.01); *F01N 2590/08* (2013.01); (Continued)

(58) Field of Classification Search
CPC ............ B01D 53/9431; B01D 53/9418; F01N 2260/22; F01N 5/02; F01N 5/00; F01N 3/2066; F01N 3/2053; F01N 3/20
See application file for complete search history.

(56) References Cited

U.S. PATENT DOCUMENTS 3,413,096 A * 11/1968 Britt ................. B01D 53/86
                                                181/237
6,444,377 B1    9/2002 Jotcham et al.
(Continued)

FOREIGN PATENT DOCUMENTS

AU     2012244305 A1    11/2012
EP          0898643 B1     3/1999
(Continued)

*Primary Examiner* — Timothy Vanoy (57) ABSTRACT

A very compact Selective Catalytic Reduction (SCR) system with a very low footprint comprising an SCR reactor, an inlet flow system, and a vaporizer module is described. The SCR reactor comprises at least one SCR catalyst which is in communication with the inlet flow system and the vaporizer module. The inlet flow system is configured to provide an approximately uniform flow of the exhaust gas through the catalyst and to provide heat to the vaporizer module. The vaporizer module is configured to allow for the conversion of urea to ammonia and to contact the ammonia with the exhaust gases in the SCR reactor upstream of the SCR catalyst.

31 Claims, 3 Drawing Sheets

(51) Int. Cl.
*F01N 3/20* (2006.01)
*F01N 3/28* (2006.01)

(52) U.S. Cl.
CPC ...... *F01N 2590/10* (2013.01); *F01N 2610/02* (2013.01); *Y02T 10/24* (2013.01)

(56) References Cited

U.S. PATENT DOCUMENTS

| | | |
|---|---|---|
| 6,620,391 B2 | 9/2003 | Müller et al. |
| 7,264,785 B2 | 9/2007 | Blakeman et al. |
| 8,105,560 B2 | 1/2012 | Phillips et al. |
| 8,302,383 B2 | 11/2012 | Oesterle et al. |
| 8,499,548 B2 | 8/2013 | De Rudder et al. |
| 2004/0076566 A1 | 4/2004 | Unger et al. |
| 2006/0153748 A1 | 7/2006 | Huthwohl et al. |
| 2008/0264048 A1* | 10/2008 | Nishiyama ......... B01D 53/9431 60/299 |
| 2008/0271443 A1* | 11/2008 | Bruck ................ B01D 53/9431 60/320 |
| 2009/0127511 A1 | 5/2009 | Bruck et al. |
| 2010/0024379 A1 | 2/2010 | Sengar et al. |
| 2012/0020854 A1* | 1/2012 | Makartchouk ........ F01N 3/2066 423/210 |
| 2012/0260635 A1 | 10/2012 | Aneja et al. |
| 2013/0266496 A1* | 10/2013 | Hansen ................ F01N 3/2889 423/210 |
| 2014/0255289 A1* | 9/2014 | Kwan ................ B01D 53/9431 423/358 |
| 2014/0311133 A1* | 10/2014 | Norling ................ B01F 5/0659 60/286 |
| 2015/0260071 A1* | 9/2015 | Reichert ................ F01N 3/2066 423/239.1 |
| 2015/0377110 A1* | 12/2015 | Sandberg ........... B01D 53/9477 422/171 |
| 2015/0377111 A1* | 12/2015 | Laurell ................ F01N 13/009 422/170 |

FOREIGN PATENT DOCUMENTS

| | | |
|---|---|---|
| EP | 0835160 B1 | 5/2000 |
| EP | 1235976 A2 | 9/2002 |
| EP | 1458960 A2 | 9/2004 |
| KR | 20120139944 A | 12/2012 |
| KR | 20140086484 A | 7/2014 |
| WO | 9743528 A1 | 5/1997 |
| WO | 0142630 A2 | 6/2001 |
| WO | 03054364 A3 | 7/2003 |
| WO | 2004038192 A1 | 5/2004 |
| WO | WO 2011147556 A1 * 12/2011 ........... F01N 3/2066 |
| WO | 2012157066 A1 | 11/2012 |
| WO | 2014107129 A1 | 7/2014 |

* cited by examiner

COMPACT SELECTIVE CATALYTIC REDUCTION SYSTEM FOR NITROGEN OXIDE REDUCTION IN THE OXYGEN-RICH EXHAUST OF 500 TO 4500 KW INTERNAL COMBUSTION ENGINES

BRIEF DESCRIPTION OF INVENTION

The invention concerns a compact Selective Catalytic Reduction System (SCR) for the reduction of NOx in which a stream of hot treated exhaust gas is used to provide for decomposition of the urea into its active components including ammonia. A compact system comprising an SCR reactor, an inlet flow system, and a vaporizer module is described. The SCR reactor comprises at least one SCR catalyst and is in communication with the inlet flow system and the vaporizer module. The inlet flow system is located adjacent to at least four sides of the SCR reactor and is configured to provide an approximately uniform flow of the exhaust gas through the catalyst and to provide heat to the vaporizer module. The vaporizer module is configured to allow for the conversion of urea to ammonia and to contact the ammonia with the exhaust gases in the SCR reactor. The configuration of the compact system allows for decomposition of the reductant precursor into the active reductant prior to reductant injection into the main exhaust flow, resulting in a shorter distance needed for mixing and a more compact system compared to state of the art systems used with 500 to 4500 Kilowatt (kW) engines.

BACKGROUND OF THE INVENTION

The selective catalytic reduction (SCR) of nitrogen oxides ($NO_x$) in flue gases is used in many industries worldwide to comply with national and international emission legislation. Nitrogen oxides formed in the combustion process of fossil and renewable fuels are reduced with a reductant, such as ammonia, on a catalytic surface. Various catalysts have been used on a variety of substrates, such as vanadium oxides, ion-exchanged zeolites etc. The catalysts can be prepared in different formulations and can be present in different forms, such as extruded or coated honeycombs, metal substrates etc. One of the major factors that determine the selection of the appropriate catalyst is the temperature of the flue gas. While ammonia is preferred as a reductant, the direct use of ammonia is problematic due to the hazardous nature of gaseous ammonia. Therefore, substances that are easy to handle and decompose to form ammonia when injected into the hot flue gases are normally used. For example, an aqueous urea solution decomposes at temperatures above 140° C. to form ammonia and isocyanic acid (HNCO), which then hydrolyzes to form ammonia and carbon dioxide. However, the generation of ammonia from an aqueous urea solution is a relatively slow process. If the residence time of urea in the hot gas stream is too short, this can lead to precipitation on the reactor walls or worse, on the catalyst. Therefore, relatively long injection ducts with a length of several meters are located upstream of the actual catalyst used in current state of the art SCR applications. These long ducts are typically a straight tube through which the exhaust flows and in which the reductant is injected into the hot gas stream by means of an injector or a lance.

The SCR systems described above have generally been used on large, stationary systems, such as power plants. Smaller SCR systems have been used in automotive applications and in engines generally below 600 kW. These smaller SCR systems have different designs due to lower exhaust volumes and therefore, a smaller mass flow of reductant needed to be introduced into the system. Recently, emission regulations for the 500 to 4500 Kilowatt (kW) diesel and gas engines have been established for the marine, off-road and power generation sectors. Currently the systems used in engines of these sizes consist of a long exhaust pipe (up to around 10 m) with a large diameter (up to around 0.6 m) and a SCR reactor located in the flow of the exhaust gas. An aqueous urea solution is injected directly in the exhaust gas by means of a lance. The urea subsequently converts to ammonia in the full exhaust gas flow. To achieve a uniform ammonia concentration pattern across the catalyst cross section, the flow is deliberately disturbed by static mixers. Often, the ammonia is directly introduced through an ammonia injection grid (AIG) into the full exhaust flow before being passed through one or multiple mixers and then the SCR catalyst. Uneven flow distributions can result in spots with low temperature sections leading to precipitation or corrosion from the partly decomposed urea. These urea losses also result in a decrease in NOx conversion activity because precipitated material cannot participate in the reaction to convert urea to ammonia.

Space is a crucial factor in applications for marine, off-road and power generation sectors and the use of space can affect the economics of operation in these sectors. For example, a super yacht or a ferry might lose passenger space directly resulting in lost income. Large mining excavators and trucks would need to reduce the loads that they can move or carry, resulting is the need to perform additional excavations or make additional trips in order to move the same amount of material. In certain vehicles, such as tug boats, the machine rooms may not have the space required to install the current state of the art SCR set-up.

The compact SCR system described herein allows for the use of urea in reducing the levels of nitrogen oxides ($NO_x$) in exhaust gases using an SCR process in engines having a size in which exhaust aftertreatment system space constraints had previously been an obstacle to their use. One of the advantages of the compact SCR system described herein is that the system, in addition to being able to be used with new engines in the sectors described above, also allows for the installation of aftermarket systems so that existing engines will be able to reduce their emissions as well.

SUMMARY OF THE INVENTION

A compact selective catalytic reduction system comprising an SCR reactor, an inlet flow system, and a vaporizer module is described in which a stream of hot treated exhaust gas is used to provide for decomposition of the urea into its active components including ammonia. The system allows for a relatively long residence time of urea/ammonia in the vaporizer module before the reductant is fed into the exhaust gases which subsequently are passed into an SCR catalyst in an SCR reactor. The SCR reactor comprises at least one SCR catalyst and is in communication with the inlet flow system and the vaporizer module. The inlet flow system comprises one or more entrances for exhaust gases to enter from an engine. The entrance is configured to distribute the flow of gases into flow streams through flow ducts around the SCR reactor. The flow of exhaust gases through flow ducts around the SCR provides additional heat to the vaporizer module to volatilize a solution of urea, or an ammonia precursor, introduced into the vaporizer module which is also heated by a stream of clean hot exhaust. The flow ducts contain a series of baffles that can control the travel time of the gases in the system in some embodiments. Urea, or an ammonia precursor, is introduced into a stream of gas that has been passed through the SCR reactor in a vaporizer module. There, the volatilized urea, or an ammonia precursor, is mixed with the stream of hot gases that have been passed through the SCR reactor and it becomes converted to ammonia. Gas containing ammonia from the vaporizer module is mixed with exhaust gases in the flow ducts. The combined gases are mixed, and then introduced into the SCR reactor, where the mixture of gases has an approximately uniform gas velocity and concentration profile across the cross section of the SCR reactor. The system does not use an ammonia injection grid (AIG), as it is often used in traditional SCR processes. After passing through the SCR catalyst, the treated exhaust gases are split into a primary flow, which is exhausted from the system, and a secondary flow, which is passed to the vaporizer module.

Many of the preferred aspects of the invention are described below. Equivalent compositions are contemplated.

BRIEF DESCRIPTION OF THE DRAWINGS

The invention will be better understood and its advantages will become more apparent from the following detailed description, especially when taken with the accompanying drawings.

DETAILED DESCRIPTION OF THE INVENTION

The invention provides an SCR system comprising an SCR reactor, an inlet flow system, and a vaporizer module. There are several embodiments which will be described in preferred forms. An inlet flow system is located adjacent to at least four sides of the SCR reactor and is configured to provide an approximately uniform flow of the exhaust gas through the catalyst and to provide additional heat to the vaporizer module. The vaporizer module is configured to allow for the conversion of urea to ammonia and to contact the ammonia with the exhaust gases upstream of the SCR catalyst. The configuration of the system allows for a longer decomposition time of the reductant precursor in the system compared to state of the art systems used with 500 to 4500 Kilowatt (kW) engines with a similar footprint.

The system provides a reactant, preferably ammonia, which can react with compounds present in exhaust gas to reduce the levels of $NO_x$ in the gas. In an embodiment, the reactant is formed by converting a compound that can form ammonia, such as urea, into the reactant in the gas phase, combining the gas containing the reactant with exhaust gas containing $NO_x$ and then passing the combined gases through an SCR catalyst in an SCR reactor. In order to convert the urea to ammonia, an aqueous solution of urea is injected into a flow of hot gas where both the water and the urea volatilize and become present in the hot gas as vapors. The hot cleaned gas used to vaporize the solution of urea is obtained from cleaned gas formed after the mixture of ammonia and exhaust gas passes through the SCR catalyst. Heat from the cleaned gas and from the raw gas via heat transfer into the vaporizer module vaporizes both water and urea and converts urea to ammonia. The term "raw" exhaust gas is meant to describe exhaust gas before it has been treated. The term "clean" exhaust gas is meant to describe exhaust gas after it has been passed through the SCR catalyst in presence of a reductant.

The apparatus and process described herein is effective with urea, but can utilize other $NO_x$-reducing reagents, either ammonia forming or other $NO_x$-reducing reagents, capable of forming a reactant gas upon heating. The reactions that occur are well known in the art. A summary of these reactions are described in U.S. Pat. Nos. 8,105,560 and 7,264,785, which of which is incorporated by reference in its entirety.

The term "urea" is meant to include urea, $CO((NH_2)_2)$ and reagents that are equivalent to urea because they form ammonia and HNCO when heated. Other $NO_x$-reducing reagents known in the art can also be used. In another embodiment, $NO_x$-reducing reagents that do not form urea or HNCO, but react with compounds present in exhaust gas to reduce the levels of $NO_x$, can be used.

The volume of urea solution introduced is dependent upon both the $NO_x$ mass flow and the concentration of urea in the solution. The amount of urea introduced is related to the $NO_x$ concentration based on the stoichiometry of the reactions involved, the temperature of the raw exhaust gas and the catalyst to be used. The amount of urea used is related to the "NSR", which refers to the relative equivalents of nitrogen in the urea, or other $NO_x$-reducing agent, to the equivalents of nitrogen in the $NO_x$ in the gases to be treated. The NSR can range from about 0.1 to about 2, but preferably is within the range from 0.6 to 1.2, inclusive.

The SCR catalyst used in the compact SCR system described herein can be selected from those known in the art as being capable of reducing the concentration of nitrogen oxides concentration in the presence of ammonia. These include, for example, zeolites, oxides of vanadium, tungsten, titanium, iron, copper, manganese, and chromium, noble metals such the platinum group metals platinum, palladium, rhodium, and iridium, and mixtures thereof. Other SCR catalyst materials conventional in the art and familiar to the skilled artisan, such as activated carbon, charcoal or coke, can also be utilized. Preferred catalysts include transition metal/zeolites e.g. Cu/ZSM-5 or Fe/Beta; vanadia-based catalysts such as $V_2O_5/WO_3/TiO_2$; or non-zeolite transition metal catalysts such as $Fe/WO_x/ZrO_2$.

These SCR catalysts are typically mounted on a support such as a metal, ceramic, zeolite, or are extruded as a homogeneous monolith. Other supports known in the art can also be used. It is preferred that the catalysts are coated onto a flow-through monolith substrate, a filter substrate or in an extruded form. Most preferable, the catalysts are coated onto a flow-through monolith substrate or are in an extruded form. It is preferred that these catalysts are present in or on a honeycomb flow-through support. For a small volume SCR system, SCR catalysts with relatively high cell densities are preferable, for example 45 to 400 cells per square inch (cpsi), more preferable 70 to 300 cpsi and even more preferable 100 to 300 cpsi.

Figure 1:
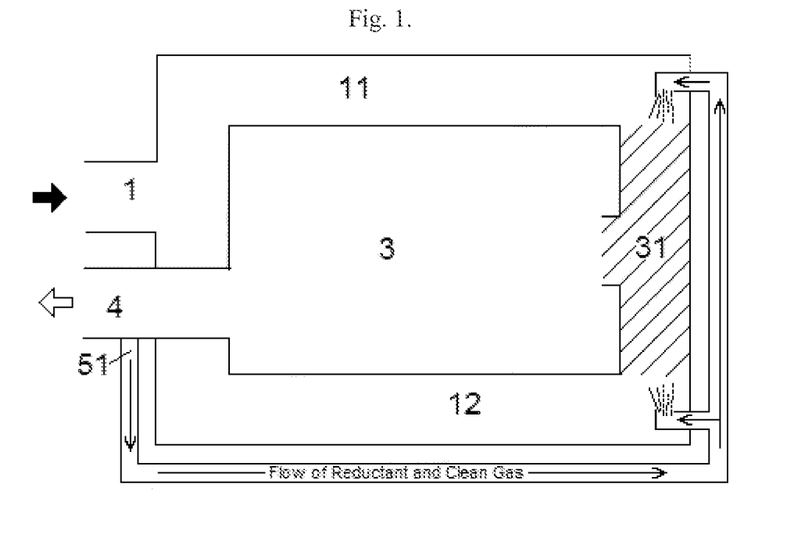
FIG. 1 is a schematic representation of an embodiment of a compact SCR system where the inlet flow is transferred through two flow ducts to the back of the system where it is turned around and passed through the SCR catalyst; a portion of cleaned exhaust gas is mixed with urea and then introduced into the exhaust gas stream prior to passing through the catalyst.
Figure 2:
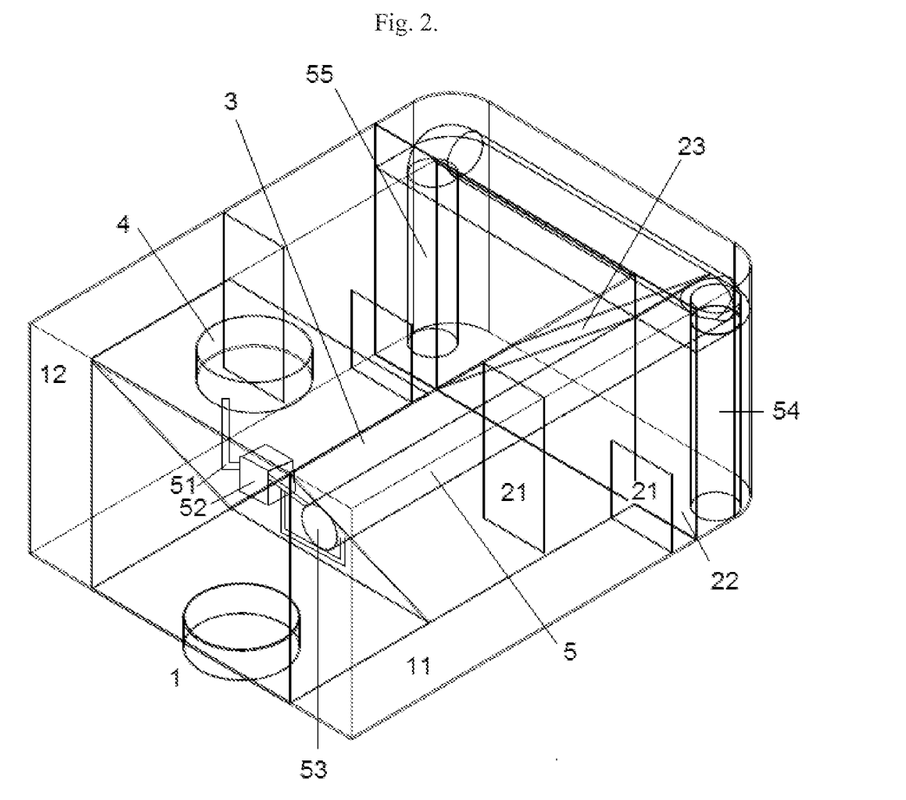
FIG. 2 is a three-dimensional schematic representation of an embodiment of a compact SCR system where the exhaust gas stream is passed through two flow ducts on either side of the reactor before a mixture of cleaned exhaust gas and urea is introduced into exhaust gas prior to passing through the catalyst.

FIG. 1 is a schematic representation of an embodiment of an SCR system in which the exhaust gas from an engine is distributed into two flows in an inlet flow system. In another embodiment, the exhaust gas from an engine can be maintained in a single flow within the inlet flow system. In other embodiments, the exhaust gas from an engine is distributed into three or more flows in an inlet flow system. The number of flows in the inlet system is dependent upon several factors, including the space available for the SCR system and the temperature and mass flow of the exhaust gas. In an embodiment, the compact SCR system receives exhaust gases from an engine generating between about 500 kW and about 1000 kW (1 MW), or from about 1000 kW (1 MW) to about 2000 kW (2 MW), or from about 2000 kW (2 MW) to about 4500 kW (4.5 MW). Engine exhaust gas flows into the SCR system through entrance 1 which can be a single entrance flange for an engine with one cylinder bank or two or more entrances for multiple, e.g. two cylinder banks engine (a V-engine with a turbocharger on each bank of the V). Typically, and for a preferable flow pattern, round entrances into the system like tubes/flanges would be used, but other shapes may also be used such as square, rectangular, triangular or oval shape. After entering the system through entrance 1, the gas flow is distributed into one or more, preferably two flow ducts, around the reactor section 3 as shown in an exemplary embodiment in FIG. 1 as numbers 11 and 12. The flow ducts can have rectangular, square, circular or half-circular cross sections. In an embodiment, the system comprises two flow ducts having a rectangular cross section where the height of each flow duct is approximately ½ the length of the flow duct, see FIG. 2. Increased fuel efficiency can be realized by using a larger cross sectional area, which can be achieved with more than one flow duct at constant duct cross section, which results in lower pressure loss (head loss). When two or more inlets are used, fluctuations in temperatures, pressures, etc. between the cylinder banks are equalized.

In an embodiment, a plurality of flow ducts are present and the gas flow in each of the ducts is approximately equal. By approximately equal, it is meant that, for example in a system having two flow ducts, that the mass flow rates range from about 50:50 to about 65:35, preferably from about 50:50 to about 60:40, and more preferably from about 50:50 to about 55:45. The ratios of the mass flow in a plurality of flow ducts should be adjusted to provide a uniform concentration of ammonia, or other reductant, across the cross section of the catalyst in the SCR reactor. In embodiments having a plurality of exhaust flows, the system equalizes differences between the flows, such as pressure and temperature, in the entrance 31 to the SCR reactor section 3. The figures show embodiments where the flow ducts are located around the sides of the SCR reactor. In other embodiments, the flow ducts can go above and below the reactor. In other embodiments flow ducts can be located around one or more sides and above/or below the SCR reactor.

Figure 3:
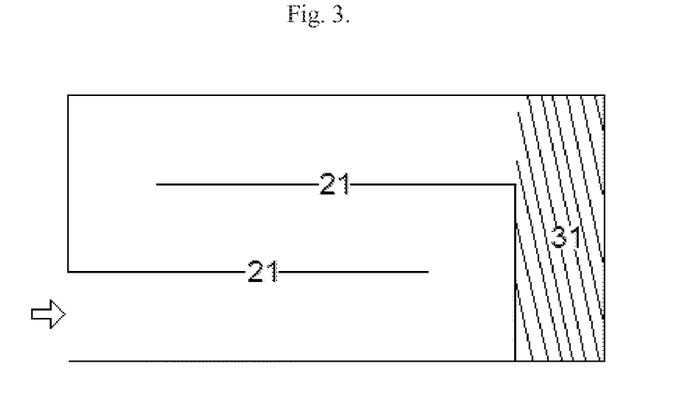
FIG. 3 is a schematic representation of an embodiment of a flow duct in which the exhaust gas travel time before ammonia introduction is increased through flow-parallel baffles prior to passing through the catalyst.

In an embodiment, each of the flow ducts 11 and 12 are fitted with baffles 21 (see FIG. 2) to increase the local velocity of the gas flow in the streams. This results in the flow becoming more turbulent and improves mixing of the exhaust gas with evaporated urea or other reductant. In some embodiments, the baffles can increase the exhaust gas travel time before the introduction of ammonia. The size and location of the baffles is dependent upon a number of factors, such as the volume of exhaust gas produced by the engine, its temperature etc. At the end of each flow duct 11, 12, a perforated plate 22 may be positioned to equalize the flow of gases. The size and location of the plate, the number, size and location of the perforations can vary depending upon a number of factors, such as the volume of exhaust gas produced by the engine, permissible back pressure, temperature etc. In another embodiment, especially when higher back pressures are permissible for the engine, the residence time of the exhaust flow in the flow duct can be increased further by directing it to the back, the front and to the back again, as shown in FIG. 3. In general, an increase in the exhaust flow travel time is necessary to control the amount of reductant to be dosed by means of a NOx sensor and an electronic control unit and a vaporizer module which are explained below. Furthermore, the higher gas velocity in this embodiment improves the mixing of raw exhaust and ammonia due to higher turbulence levels.

Figure 4:
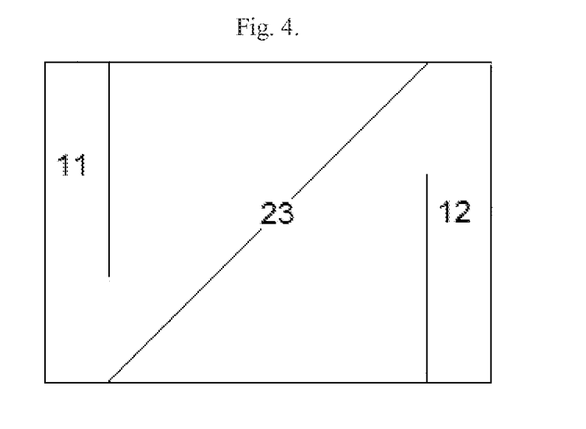
FIG. 4 is a schematic representation of an embodiment of one angled flow plate at the back of the compact SCR system which allows for relatively homogeneous momentum distribution upstream of the catalyst.

The direction of flow in each flow duct 11 and 12 is turned by 90° and is directed towards an angled flow plate 23 located in a connecting passage 31 between the two flow ducts 11 and 12 to achieve a uniform momentum distribution upstream of the catalyst. FIG. 4 shows a schematic of one embodiment of this angled flow plate 23 representing a cut through the back of the compact SCR system. FIG. 4 shows a cross-section of the connecting passage 31 as shown in FIG. 1. In a connecting passage 31 (see FIGS. 1 and 4), the exhaust gas is mixed with hot gas containing reductant, as described below. The location and orientation of the angled plate provides a substantial uniform flow of gases across the cross section of the SCR reactor 3. Uniform exhaust flow across the catalyst in the SCR reactor results in an equalized utilization of the catalyst and provides maximum NOx conversion.

SCR catalyst bricks are located in the center of the SCR reactor section 3. These catalyst bricks are not shown in FIGS. 1 and 2. The SCR catalyst bricks can have any of a number of cross-sectional shapes perpendicular to the direction of the gas flow, including square, rectangular, hexagonal and circular, with square or rectangular being preferred for higher utilization of the cross-sectional area. In an embodiment, the SCR catalyst bricks are square and have a cross section of about 150×150 mm$^2$.

The exhaust gas then passes from the connecting passage 31 through the SCR catalyst bricks (not shown) in reactor 3, where the NOx reacts with reductant on the catalyst surface in the Selective Catalytic Reduction reaction so that the amount of NO$_x$ in the exhaust gas is reduced. For the SCR reaction to be effective in reducing NOx levels, the temperature of the combustion gases including the gasified urea should be at least about 100° C., typically between about 180° and about 600° C., and preferably above at least about 250° C. The composition, form and especially the volume of the catalyst used in the SCR reactor can be selected based on the temperature and mass flow of the gases in the SCR reactor, as well as, the NOx load and other exhaust gas constituents like hydrocarbons, sulphur etc. to provide for a selective reduction in the catalytic reduction of nitrogen oxides into nitrogen.

Figure 5:
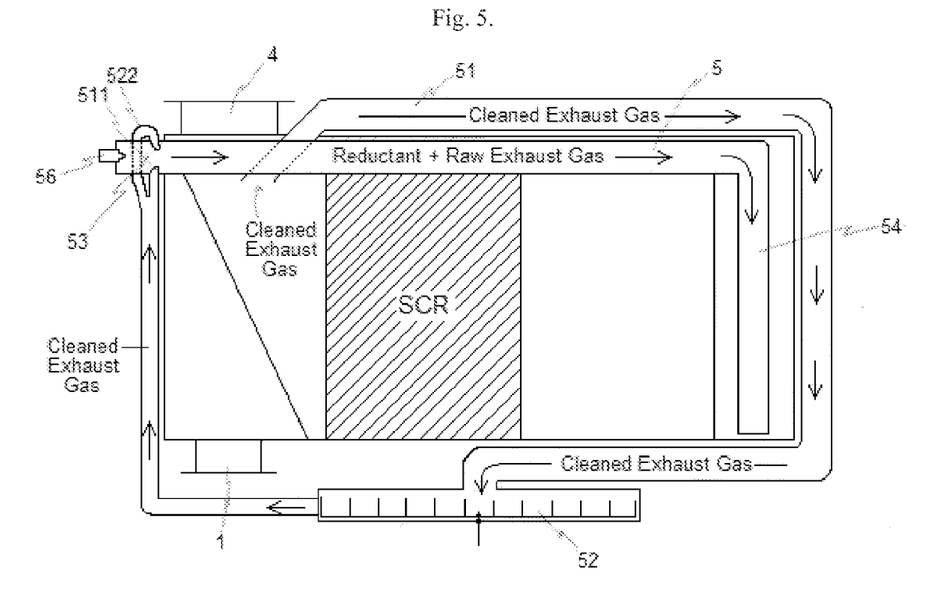
FIG. 5 is a side view of an embodiment of a compact SCR system where a portion of cleaned exhaust gas is mixed with urea and then reintroduced into exhaust gas prior to passing through the catalyst.

Exhaust gas that has passed through the SCR catalyst is defined as having been cleaned, or is considered to be a clean exhaust gas. The clean exhaust gas then leaves the compact SCR system through exhaust flange 4, see FIGS. 1 and 2. A portion of the clean exhaust gas is separated from the majority of the cleaned exhaust gas flow as shown in FIG. 1. The amount of clean exhaust gas separated from the majority of the cleaned exhaust gas flow depends on a variety of factors including the temperature, flow rate and NOx load of the exhaust gas. The portion of the clean exhaust gas separated can range from around 1 to 30%, preferably from 5 to 15%, more preferably from about 7 to 10%, based on the total amount of raw exhaust gas entering through inlet flange 1. In an embodiment, a portion of the clean exhaust gas is separated in a tube located downstream of the exhaust flange. In another embodiment, a portion of the clean exhaust gas is separated in a tube located upstream of exhaust flange 4. FIG. 5 shows a preferable embodiment of the urea vaporizer module. The portion of the cleaned exhaust gas removed is transferred to the injection head 53 in the urea vaporizer module through a connection, preferably a pipe 51. In an embodiment, a hot air compressor 52 connected to the pipe 51 is used to transfer the cleaned exhaust gas to an injection head 53 in the vaporizer module. Additional input of cold, fresh air can decrease the energy demand of the hot air compressor due to an increase of gas density. In another embodiment, mechanical energy provided from, for example, the exhaust gas stream up- or downstream of the compact SCR system by means of a turbocharger or a combination of hot air compressor and turbocharger can be used to compress and transfer cleaned hot gas to the injection head 53. In another embodiment, a means of utilizing mechanical energy, such as an engine axle, etc. can be used.

Figure 6:
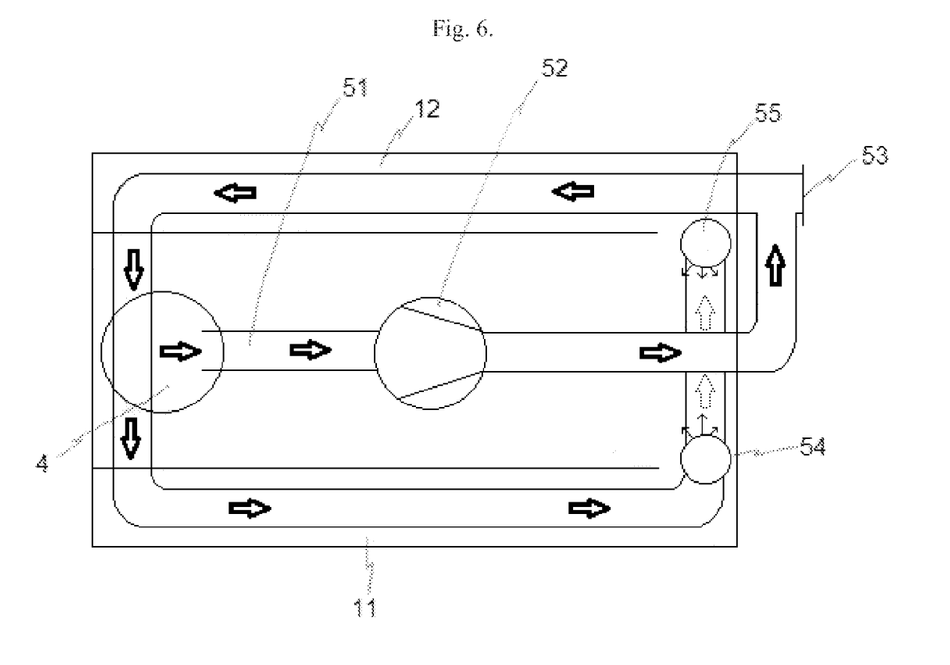
FIG. 6 is a schematic representation of a top view of an embodiment of a vaporizer module in which the urea vaporizer tube has a length that is approximately two times the length of the tube shown in FIG. 2.

The flow of cleaned exhaust gas to the injection head 53 is divided into a plurality of subflows. FIG. 5 shows the flow of the cleaned gas being divided into two subflows (511, 512). Each of the subflows is fed into an injection head 53 in a urea vaporizer tube 5 of the vaporizer module. In a preferred embodiment, the subflows are introduced around the injection head 53 and are tangentially offset to induce a swirl of hot gas in the urea vaporizer tube 5. The distribution tube 5 shown in FIGS. 2 and 5 has a length that is approximately the length of the compact SCR reactor system. In other embodiments, the length of the distribution tube is a fraction, preferably greater than one, of the approximate length of the SCR reactor. FIG. 6 shows a schematic representation of an embodiment of a vaporizer module in which the urea vaporizer tube has a length that is approximately two times the length of the SCR system.

The flow of the hot clean gas in the vaporizer tube 5 can have a velocity of from 2 to 20 meters per second, preferable approximately 10 meters per second, as to achieve a residence time of about 100 milliseconds. One of ordinary skill in the art would recognize that both the residence time and the temperature of the gas in the vaporizer tube 5 are important factors in ensuring the volatilization of the solution and the conversion of urea to ammonia. Based on these factors, the residence time of the vapor can be adjusted to provide the required conversion of urea to ammonia specific to the combustor's operating conditions and conversion requirements. An aqueous solution of urea is pumped into a nozzle 56 in the injection head 53 and released from the nozzle 56 into the urea vaporizer tube 5 as droplets. The aqueous solution of urea is maintained at a concentration suitable for storage and handling without precipitation or other problems. The concentration of urea in the aqueous solution can range from about 5 to 55%, preferably from about 15 to about 45%, more preferably from about 30 to about 40%. Inside the urea vaporizer tube 5, the water and urea are vaporized and urea is decomposed into ammonia. The residence time of water/urea/ammonia in the vaporizer tube is set to approximately 50 to 200 milliseconds, preferably about 100 milliseconds. The ammonia-laden gas is fed into ammonia distribution tubes 54 and 55, see FIG. 2. The temperature in the distribution tubes should be maintained at a temperature at least about 150° C., and preferably at least 200° C. A preferred temperature range is from about 300° to about 450° C. The use of clean gas provides a means to control and/or adjust the velocity of the gas with ammonia or another reductant in the urea vaporization tube 5 and ammonia distribution tubes 54 and 55, minimizes side reactions of urea decomposition products with raw exhaust constituents like hydrocarbons, sulphur, etc. and therefore provides control of the aqueous urea evaporation/decomposition time and therefore the possibility to achieve the highest possible NOx reduction at the lowest possible ammonia slip.

The ammonia distribution tubes comprise means for combining the ammonia-laden gas with the exhaust gas stream from flow ducts 11 and 12 to form an ammonia-exhaust gas stream. In an embodiment, the means for combining the ammonia-laden gas with the exhaust gas stream comprises a plurality of outlets spaced along at least a portion of the ammonia distribution tubes 54 and 55 in an area where the flow of gas from the flow ducts 11 and 12 can combine with the ammonia-laden gas. In a preferred embodiment, each of the ammonia distribution tubes 54 and 55 contain a plurality of holes or openings oriented such that the openings in tube 54 are directed towards tube 55 and the openings in tube 55 are directed towards tube 54. The number, size, location and orientation of the openings can be varied depending upon the flow rate of the exhaust and the configuration of the compact SCR system. The openings are designed so that approximately the same mass flow occurs on each side of the flow which is a function of the pressure loss of the vaporizer tube system 5. The use of a slight overpressure provided by the hot air compressor or turbocharger etc. allows for the control of the flow of the hot gases containing the reactant. In an embodiment where there is only one flow duct, one ammonia distribution tube is sufficient. The well-distributed ammonia-exhaust gas stream then flows to the SCR reactor section 3, where it passes through an SCR catalyst and is converted to cleaned exhaust gas. In a preferred embodiment, the compact SCR system does not use an ammonia injection grid (AIG) as is often used, or required, on traditional SCR processes. In an embodiment, a fresh air blower is located before or after the urea injection point to provide sufficient pressure to introduce the side stream into the main stream.

In an embodiment, the compact SCR system further comprises a means to access the SCR reactor to replace the catalyst. In a preferred embodiment, the means is a door located on the top or the side of the reactor.

In an embodiment, the compact SCR system further comprises one or more NOx sensors and/or ammonia ($NH_3$) sensors. The NOx and/or $NH_3$ sensors are linked to a unit that controls the amount of urea and of clean gas that is transferred into the vaporizer module and subsequently into the exhaust gas. In an embodiment, a NOx sensor is located at the exhaust gas inlet on a flow duct. In another embodiment, a NOx or NH$_3$ sensor located downstream of the SCR catalyst can be used for closed-loop control. In another embodiment, a downstream NOx sensor is located in the clean gas flow which is fed from a hot air compressor to a vaporizer tube. In yet another embodiment, the system further comprises a NOx sensor in the inlet upstream of the flow duct. In still another embodiment, the system provides a raw exhaust gas travel time in the system before introduction of the clean gas/ammonia mixture, so that timely injection, for example in case of load changes, can be ensured, viz. an electronic control unit has sufficient time to calculate and provide the necessary amount of urea to be dosed (i.e.: (NOx sensor time+electronic processing time+ urea residence time in tube 5)=(time, the exhaust gas requires from NOx sensor to ammonia distribution tube).

In a preferred embodiment, the compact SCR system comprises one or two inlet flanges to pass exhaust gases from single- or double cylinder bank (e.g. V-cylinder) engines having power of 500 to 4500 kW. In a preferred embodiment, the flanges are circular.

In preferred embodiments, the system has two flow ducts positioned on each side of the reactor, (as shown in FIG. 1), a vaporizer tube of approximately the same length as the reactor, two ammonia distribution tubes with hydraulically optimized holes to achieve similar flow through both tubes, and an angled flow plate (as shown in FIG. 4) where the exhaust gas stream flows along the plate (as opposed to the flow plate angled the other way round i.e. from top left to bottom right where the flow ducts exit into the reactor section 3). The catalyst used in these embodiments can vary widely in cell densities, depending upon several factors, including the nature of the fuel used and the levels of impurities in the fuel.

In an embodiment, the SCR system further comprises an oxidation catalyst located upstream of the urea input in each flow duct to reduce hydrocarbons which may decrease SCR activity. The oxidation catalyst also oxidizes CO, aromatics, etc.

The above description is intended to enable the person skilled in the art to practice the invention. It is not intended to detail all of the possible modifications and variations that will become apparent to the skilled worker upon reading the description. It is intended, however, that all such modifications and variations be included within the scope of the invention that is seen in the above description and otherwise defined by the following claims.

The invention claimed is:

1. A Selective Catalytic Reduction (SCR) system comprising an SCR reactor, an inlet flow system, and a vaporizer module, wherein
   a. the SCR reactor comprises at least one SCR catalyst and is in communication with the inlet flow system and the vaporizer module,
   b. the inlet flow system comprises one or more entrances for exhaust gases from an engine, wherein the entrance is configured to distribute the flow of gases through at least one flow duct located around the SCR reactor, wherein the flow of exhaust gases through the flow ducts around the SCR provides heat to the vaporizer module in which urea, or an ammonia precursor, is introduced into the vaporizer module to be converted to ammonia prior to being introduced into the SCR reactor, and the flow of gases in each of the flow ducts is introduced into the SCR reactor after the introduction of an ammonia-laden gas stream and after passing through a plurality of baffle plates to provide an approximately uniform gas velocity and concentration profile across the cross section of the SCR reactor, and
   c. a vaporizer module comprising a means for introducing urea, or an ammonia precursor, into a heated pre-reactor in which it is at least partially decomposed and subsequently fed into an exhaust gas stream prior to introducing the exhaust gas stream to the SCR reactor.

2. The system of claim 1, wherein the heated pre-reactor is heated by a stream of cleaned exhaust gas.

3. The system of claim 1, further comprising a solid plate mounted diagonally in a connecting passage between at least one flow duct and the SCR reactor section.

4. The system of claim 1, wherein the system is configured to provide an about uniform concentration of ammonia across a cross section of the catalyst.

5. The system of claim 1, wherein the inlet flow of gas is separated into two or more flow ducts.

6. The system of claim 5, wherein the flow of gas in each of the flow ducts is approximately equal.

7. The system of claim 1, wherein pressure and/or temperature fluctuations, originating from the combustor's operating conditions, are minimized between two inlet ducts.

8. The system of claim 1, the SCR system having a length to height ratio of approximately 2.

9. The system of claim 1, wherein at least one of the flow ducts is located on a first side of the SCR reactor and at least one of a different flow duct is located on the opposite side of the SCR reactor.

10. The system of claim 1, wherein the baffle plates are located and oriented to provide a uniform momentum distribution of exhaust gas upstream of the catalyst and to increase the travel time of the exhaust gas before the addition of ammonia.

11. The system of claim 1, further comprising a means for controlling the introduction of urea or an ammonia precursor.

12. The system of claim 11, wherein the means for controlling the introduction of urea or an ammonia precursor comprises a NOx sensor.

13. The system of claim 1, wherein the reactor width is greater than, or equal to, the reactor height.

14. The system of claim 1, wherein the flow ducts are rectangular, square, circular or semicircular.

15. The system of claim 1, wherein the rectangular flow ducts have a rectangular cross section and the length of the flow ducts is about the length of the SCR reactor.

16. The system of claim 15, wherein the width and height of each rectangular flow duct, relative to the length of each rectangular flow duct, are approximately ⅛ or smaller and ½, respectively.

17. The system of claim 15, wherein the width and height of each rectangular flow duct, relative to the length of each rectangular flow duct, are approximately ⅙ or smaller and ⅙, respectively, if horizontal baffle plates are used.

18. The system of claim 1, wherein the at least one SCR catalyst is in the form of a monolith having a square, rectangular or circular shape in the net direction of gas flow through the monolith.

19. The system of claim 1, wherein the SCR reactor comprises at least one SCR catalyst in the form of a monolith.

20. The system of claim 1, wherein the vaporizer module comprises a means for removing a portion of the clean exhaust gas exiting the SCR reactor, a means for collecting the portion of the clean exhaust gas under pressure, a means for feeding the pressurized clean exhaust gas into a vaporizer tube and a means for injecting urea, or an ammonia precursor, into the clean exhaust gas in the vaporizer tube.

21. The system of claim 20, wherein the means for removing a portion of the clean gas exiting the SCR reactor and collecting the portion of the clean exhaust gas under pressure is a hot air compressor or a means utilizing mechanical energy from the engine.

22. The system of claim 20, wherein mass flow and the temperature of the clean gas and residence time of the urea, or the ammonia precursor, in the hot gas stream are sufficient to achieve the full evaporation of the water and thermal decomposition of the urea, or ammonia precursor.

23. The system of claim 20, wherein the gas velocity in the vaporizing tube is about 10 meters per second.

24. The system of claim 20, wherein the mass flow of clean gas removed is less than about 10% relative to the total exhaust mass flow.

25. The system of claim 20, wherein the vaporizer tube has a length approximately the same as the length of the reactor.

26. The system of claim 20, wherein the vaporizer tube is located in at least one of the flow ducts.

27. The system of claim 20, further comprising a means to split the clean gas mass flow into about half and a means to feed the clean gas into the vaporizer tube in an offset manner to create a swirl flow in the vaporizer tube.

28. The system of claim 20, wherein an aqueous urea solution is injected.

29. The system of claim 20, wherein ammonia then is introduced into both flow duct/reactor passages.

30. The system of claim 20, wherein the distribution of the ammonia-laden clean gas into the exhaust flow is provided in a uniform manner using a device located in the middle of each passage between a flow duct and reactor, where the devices/tubes contain openings such that about the same flow occurs across the rectangular flow passage on each of the passages.

31. A method of reducing the amount of nitrogen oxides formed in the exhaust from an engine, the method comprising passing exhaust gas from the engine through an SCR system of claim 1.

* * * * *